Patented Oct. 19, 1948

2,451,949

UNITED STATES PATENT OFFICE 2,451,949

PRODUCTION OF ACETALS

Heinz Heinemann, Upper Darby, Pa., assignor to Porocel Corporation, Philadelphia, Pa., a corporation of Delaware No Drawing. Application February 26, 1946, Serial No. 650,393

7 Claims. (Cl. 260—615)

The present invention relates to the production of acetals by the reaction of an alcohol with an aldehyde in the presence of an argillaceous adsorbent.

In accordance with the present invention, a mixture of an alcohol and an aldehyde is brought into contact with an argillaceous adsorbent under conditions promoting the formation of an acetal, and the acetal and unconverted reactants are separated from the adsorbent. The acetal and the unconverted reactants are separated by fractional distillation, and the adsorbent, when spent, is reactivated simply by heating, or by steaming and then heating.

The acetals produced in accordance with the present invention may generally be represented by the formula:

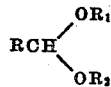

where R may be hydrogen, alkyl, or aryl radicals, and $R_1$ and $R_2$ may be similar or dissimilar alkyl or aryl radicals.

The alcohols which may be employed include the lower aliphatic alcohols such as methyl alcohol, ethyl alcohol, propyl alcohol, isopropyl alcohol, the butyl alcohols, and the amyl alcohols. Higher homologues of this series may also be used, provided such alcohols are liquid, or may be rendered liquid under the conversion conditions, i. e., by admixture with dry, inert diluents, or by the solvent action of the aldehyde used or the acetal formed. The aliphatic polyhydric alcohols such as glycol, glycerol, diethylene glycol, and the polyglycols may also be used, as well as the aromatic alcohols phenyl methanol, phenyl ethanol, phenyl propanol, and the like.

The aldehydes which may be utilized in the present invention include the lower aliphatic aldehydes such as formaldehyde, acetaldehyde, propionaldehyde, butyraldehyde, valeraldehyde, and isovaleraldehyde. Higher members of this series may also be used, if liquid, or capable of being rendered liquid under the conversion conditions, i. e., by admixture with dry, inert diluents, or by the solvent action of the alcohol used or the acetal formed. The aromatic aldehydes may also be employed and are exemplified by benzaldehyde, tolylaldehyde, exlylaldehyde, and the orthosubstituted aldehydes such as 2, 5 dichlorobenzaldehyde and 2-nitro-3, 6 dichlorobenzaldehyde.

The argillaceous adsorbents which may be used in the method of the present invention are the water-attracting materials such as activated alumina, bauxite, fuller's earth, bentonite, acid activated bentonite, synthetic calcium silicates, magnesium silicates, aluminum silicates, and silica gel. These materials are preferably activated by heating at a suitable temperature to remove at least a portion of their water content. For example, hydrated alumina, bauxite, fuller's earth, the bentonites, and the synthetic silicates may be dried and calcined by heating at 600° F. to 1200° F. for a period of time sufficient to reduce their volatile matter content (water) to about 7% by weight or less, and preferably 5% or less.

The acetal-forming reaction is carried out according to the present invention by contacting a mixture of the alcohol and the aldehyde with the adsorbent under suitable conditions of temperature and time to obtain substantial yields of acetal without excessive side reactions productive of aldehyde polymers and other substances. Temperatures between 0° C. and 50° C. have been found suitable, and excellent conversions are obtained between 15° C. and 30° C. Temperatures higher than 50° C. may be used, but usually lead to the formation of considerable amounts of aldehyde polymers. Since the conversion appears to be markedly influenced by the time of contact with the adsorbent, it is desirable to maintain the space velocity or volume of charge per volume of adsorbent per hour at 0.1 or lower. Space velocities between 0.01 and 0.1 have been found satisfactory, velocities of 0.01 to 0.03 giving the highest conversions. The mole ratio of alcohol to aldehyde is theoretically 2:1 for 100% conversion to acetal. It has been found, however, that either a lower or higher ratio may be employed, and satisfactory conversions have been obtained with either an excess of alcohol or aldehyde in the reactant mixture. In general, mole ratios of alcohol and aldehyde may range from 1:1 to 4:1, preference being had for a slight excess of alcohol over that theoretically required.

In carrying out the reaction, the alcohol and aldehyde may be mixed in the desired ratio and the mixture then contacted with the argillaceous adsorbent, provision being made to control the temperature of reaction. In one modification of the process, the reactant mixture may be percolated or filtered through a bed of activated adsorbent at a controlled temperature and rate, the adsorbent preferably being in the form of granules or pellets. In another modification, the reactants are brought into contact with finely divided activated adsorbent at controlled temperature, and the entire mixture is vigorously stirred for a sufficient period of time to effect the desired conversion. The adsorbent is thereafter removed from the reactant mixture by settling, filtration, or centrifuging, and may be regenerated by heating, or steaming followed by heating. In the percolation technique, the flow of reactants is continued until the efficiency of the adsorbent decreases to a commercially uninteresting level, at which time the supply of reactants is discontinued, the adsorbent bed is drained, the adsorbent is stripped of reactants by steaming or washing, and is then reactivated by heating at temperatures, for example, between 300° F. and 1200° F. The reactant mixture obtained by either of the above procedures may thereafter be separated into components by fractionation, the acetal being delivered to storage and the unconverted alcohol or aldehyde being recycled for further conversion. Where one or both of the reactants are gaseous or excessively volatile under the conversion conditions, a superatmospheric pressure may be imposed upon the reaction system to prevent the loss of the reactants. Since the formation of the acetal involves the condensation of 1 mole of aldehyde with 2 moles of alcohol, and consequent elimination of one mole of water, it is preferred to employ anhydrous or substantially dry reactants. However, the process of the present invention may be applied to reactants containing a small percentage of water, but the conversion is of course somewhat less effective than with dry reactants.

The present invention may be further illustrated by the following examples, which, however, are not to be construed as limiting the scope thereof.

600 volumes of 30/60 mesh bauxite which has been activated by heating at 1200° F. to a volatile matter content of 2% by weight was charged to an elongated reaction chamber, and a mixture of aldehyde and alcohol was supplied to top of the chamber and permitted to percolate downwardly through the bed of adsorbent at a controlled rate and temperature. The effluent from the chamber was then fractionally distilled to recover the acetal from unconverted aldehyde, alcohol, and polymers. The results obtained are given in the following table.

| Reactants | Mole ratio alc. to ald. | Reaction Temp. °F. | Space Velocity | Run hours | Per Cent yield Acetal |
|---|---|---|---|---|---|
| Ethyl alcohol + Propionaldehyde | 2:1 | 75 | 0.07 | 3 | 18 |
| Do | 2:1 | 75 | 0.03 | 3 | 50 |
| Do | 2:1 | 75 | 0.02 | 3 | 52 |
| Do | 1:1 | 75 | 0.03 | 3 | 50 |
| Ethyl alcohol + Butyraldehyde | 2:1 | 75 | 0.03 | 3 | 42 |

The properties of the acetals obtained as above described are compared below with those reported in the literature. Such comparison reveals that the acetals prepared by the method of the present invention substantially duplicated the pure acetals of the prior art.

| Product | Formula | Boiling Point °C. | | Density | | Molecular Wt. | |
|---|---|---|---|---|---|---|---|
| | | Exp. | Lit. | Exp. | Lit. | Exp. | Lit. |
| Ethyl propylal | $C_3H_5(OC_2H_5)_2$ | 124 | 124 | .8235 | .8232 | 131 | 132 |
| Ethyl butylal | $C_4H_7(OC_2H_5)_2$ | 143 | 143 | .8370 | .8417 | 146 | 146 |

I claim:
1. The method of producing an acetal, which comprises reacting an alcohol with an aldehyde in the presence of a naturally occurring argillaceous adsorbent which has been thermally activated.
2. The method of producing an acetal, which comprises reacting an alcohol with an aldehyde in the presence of thermally activated bauxite.
3. The method of producing an acetal, which comprises reacting an alcohol with an aldehyde in the presence of thermally activated fuller's earth.
4. The method of producing an acetal, which comprises reacting an alcohol with an aldehyde in the presence of thermally activated bentonite.
5. The method of producing an acetal, which comprises contacting a mixture of ethyl alcohol and acetaldehyde with activated bauxite at a temperature between 15° C. and 30° C. and at a space velocity of not more than 0.1.
6. The method of producing an acetal, which comprises contacting a mixture of ethyl alcohol and propionaldehyde with activated bauxite at a temperature between 15° C. and 30° C. and at a space velocity of not more than 0.1.
7. The method of producing an acetal, which comprises contacting a mixture of ethyl alcohol and butyraldehyde with activated bauxite at a temperature between 15° C. and 30° C. and at a space velocity of not more than 0.1.

HEINZ HEINEMANN.

REFERENCES CITED

The following references are of record in the file of this patent:

UNITED STATES PATENTS

| Number | Name | Date |
|---|---|---|
| 1,312,186 | King et al. | Aug. 5, 1919 |
| 1,850,836 | Guinot | Mar. 22, 1932 |
| 2,161,066 | La Lande | June 6, 1939 |
| 2,208,362 | Engel | July 16, 1940 |
| 2,350,350 | Gresham | June 6, 1944 |
| 2,382,874 | Gresham | Aug. 14, 1945 |

OTHER REFERENCES

Berkman et al., "Catalysis," pages 549 to 552 and 735 to 741 (1940).